March 11, 1941.  J. L. MONTALVO-GUENARD  2,234,729
EYEGLASSES
Filed June 28, 1939
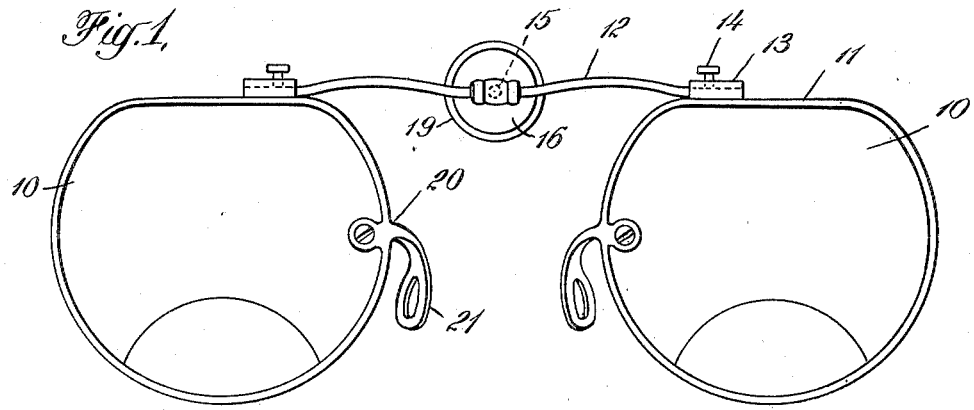
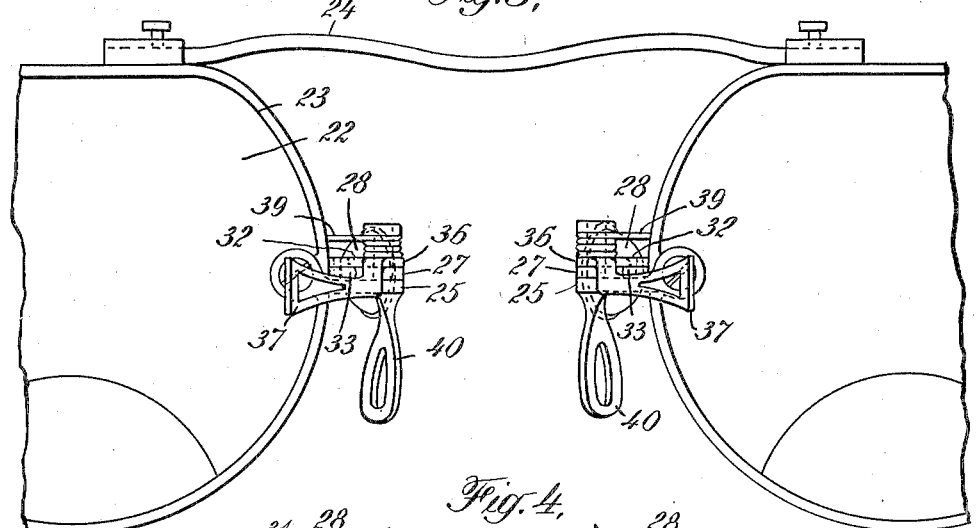
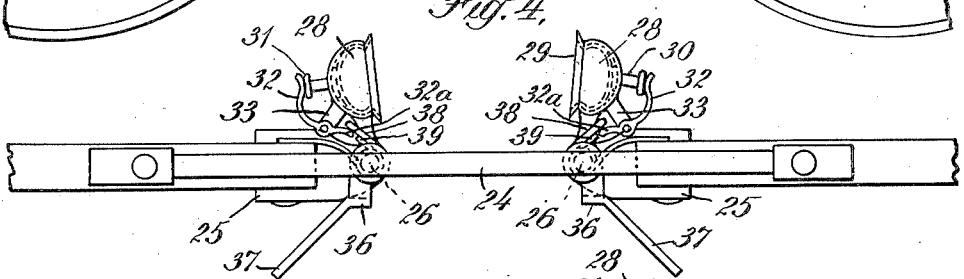
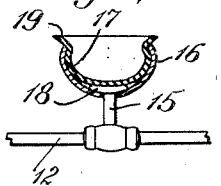
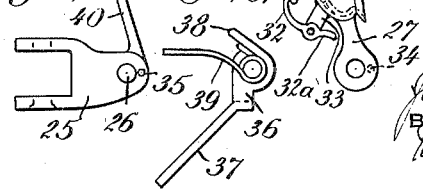
INVENTOR
José Leandro Montalvo-Guenard
BY
ATTORNEYS Patented Mar. 11, 1941

2,234,729

UNITED STATES PATENT OFFICE 2,234,729

EYEGLASSES

José Leandro Montalvo-Guenard, Ponce, P. R.

Application June 28, 1939, Serial No. 281,587

3 Claims. (Cl. 88—48)

This invention relates to eyeglasses and is concerned more particularly with a novel attaching means therefor and also with eyeglasses in which such attaching means are used.

Eyeglasses of other than the spectacle type are ordinarily held in place by pads pressed by springs against opposite sides of the nose, although it has also been proposed to provide such glasses with attaching means in the form of metal cups intended to act with a suction effect. The pince-nez construction has numerous well-known disadvantages among which are the discomfort arising from the pressure required and the uncertain action of the holding means, particularly in hot weather. The action of the metal cups, as proposed, depends on the expulsion from their cavities of the trapped air as the cups become heated by contact with the body, and this arrangement is unsatisfactory because the suction action, if obtained at all, is weak and not to be depended upon.

The present invention is, accordingly, directed to a novel attaching means for eyeglasses which overcomes the disadvantages of the constructions above referred to and provides a firm attachment without discomfort to the wearer. The new attaching means operates by suction effectively produced and it includes a rigid cup-shaped member containing a cup of flexible impervious material, such as rubber having a rim lying outside the cup. A plunger projects through an opening in the member to engage the cup and by inward movement of the plunger, the bottom of the cup may be moved away from the member and the cup partially collapsed. The rim of the cup is then applied to the surface where the attachment is to be made and the plunger released, whereupon the cup tends to resume its original shape and suction is applied to the surface and is effective to hold the glasses in position.

For a better understanding of the invention, reference may be had to the accompanying drawing, in which:

Fig. 1 is a view in front elevation of one form of eyeglasses embodying the principles of the invention;

Fig. 2 is a plan view partly in section of the suction device employed in the Fig. 1 construction;

Fig. 3 is a partial front elevational view of a modified form of glasses embodying the invention;

Fig. 4 is a plan view of the construction illustrated in Fig. 3; and

Figs. 5, 6 and 7 are plan views of details.

Referring to the drawing, the glasses shown in Fig. 1 include lenses 10, here illustrated as of the bifocal type, these lenses being carried in holders 11 connected by a bridge 12. This bridge is in the form of a bar the ends of which extend into brackets 13 attached to the holders 11 and are held in adjustable position therein by set screws 14. Secured to the bridge at its midpoint is a plunger 15 (Fig. 2), the stem of which passes through an opening in the bottom of a cup-shaped member 16 of rigid material, such as a suitable metal. Within the member is a cup 17 of a flexible impervious material such as a rubber composition and the cup contacts at its bottom with an enlarged head 18 on the end of the plunger and it has an endless rim 19 overlying the rim of the cup-shaped member. The diameter of the opening of the member is slightly less than the greatest diameter of the member so that the cup can be sprung into position and when in place can not be accidentally dislodged. The glasses are also provided with straps 20 attached to the lenses and terminating in the usual noseguards 21.

In using the glasses illustrated in Fig. 1 the rim of the cup is placed on the forehead in such position that the lenses are properly disposed and the noseguards are in contact with opposite sides of the nose. Pressure is then applied to the bridge 12 to force the plunger inwardly. The head of the plunger causes partial collapse of the cup and air is expelled out from beneath its rim. When the pressure is removed the cup tends to resume its normal position and acts upon the area defined by its rim with a suction effect which can be varied in amount in accordance with the extent to which the cup is initially collapsed. The cup of the suction device is of sufficient size so that the suction applied to the skin of the wearer is not uncomfortable and the suction is sufficient to hold the glasses securely in position.

In the construction illustrated in Fig. 3 the lenses 22 are mounted in the holders 23 connected by a bridge 24, as before. Secured to each lens is a strap 25 having a pin 26 mounted vertically therein. Mounted on the pin is an arm 27 carrying a cup-shaped member 28 containing a cup having a rim 29, the member and cup being of a construction similar to those designated 16, 17. Extending through an opening in the bottom of the member is a plunger 30 having an enlarged head to contact with the bottom of the cup. The outer end of the plunger is also provided with an enlarged head 31 against which bears one end of a lever 32 pivoted on a bracket 33 attached to the member 28. The arm 27 has a pin 34 entering an opening 35 in the strap 25, the pin holding the cup-shaped member immovable relative to the strap.

Movably mounted on the pin 26 is a lever 36 having an operating handle 37 lying in front of the plane of the lenses. The lever has an end 38 adapted to contact the end 32a of lever 32, and a spring 39 encircling pin 26 has one end acting on the lens 22 and the other against the end 38 of lever 36, the spring tending to swing the lever to keep its end 38 away from the end 32a of lever 32. Projecting downwardly from strap 25 is a noseguard 40 of suitable form.

In the use of the glasses illustrated in Fig. 3, they are picked up by having the operating handles 37 grasped between the thumb and a finger, the handles being moved toward each other in this operation. In this movement levers 36 act to swing levers 32 to force the plungers 30 inwardly and the plungers partially collapse the cups within the members 28. The rims 29 of the cups are then brought into contact with opposite sides of the nose and upon release of the handles 37 the levers 36 are swung to release the plungers, and the latter are forced outwardly as the cups tend to resume their initial shape. In this connection of the cups, suction is applied to the areas defined by their rims and the suction is sufficient to hold the glasses firmly in place. When the glasses are to be removed the handles may be grasped and moved toward each other and when this occurs the cups are again collapsed and the suction effected.

What is claimed is:

1. In eyeglasses, the combination of a pair of lenses, a bridge connecting the lenses, a strap connected to each lens, a metallic cup-shaped member rigidly attached to each strap and lying at one side of the plane of the lenses, a rubber cup within the member having a rim lying exposed at the open end of the member, a plunger having a shank projecting through an opening in the member and an enlarged head within the member in engagement with the cup, and means engaging the shank of the plunger for moving the latter inwardly to effect partial collapse of the cup, said means including a lever pivoted on the strap and having an operating end lying at the other side of the plane of the lenses.

2. In eyeglasses, the combination of a pair of lenses, a bridge connecting the lenses, a strap connected to each lens, a metallic cup-shaped member attached to each strap and lying at one side of the plane of the lenses, a rubber cup within the member having a rim lying exposed at the open end of the member, a plunger projecting through an opening in the member and having an enlarged head engaging the cup, a lever pivoted on the cup and having an end engaging the plunger, and a lever pivoted on the strap and having an end engaging the other end of the first lever, the second lever being operable through the first lever to move the plunger inward to effect partial collapse of the cup.

3. In eyeglasses, the combination of a pair of lenses, a bridge connecting the lenses, a strap connected to each lens, a nose-guard connected to each strap, a rigid cup-shaped member secured to each strap, a cup of flexible impervious material within each cup having a rim lying exposed at the open end of the cup, the rims of the cups being in position to engage opposite sides of the nose, a plunger extending through an opening in each member to engage the cup therein, and means including levers pivoted on the straps and having operating handles lying forward of the plane of the lenses, for moving the plungers inwardly to effect partial collapse of their associated cups.

JOSÉ L. MONTALVO-GUENARD.